Figure 1:
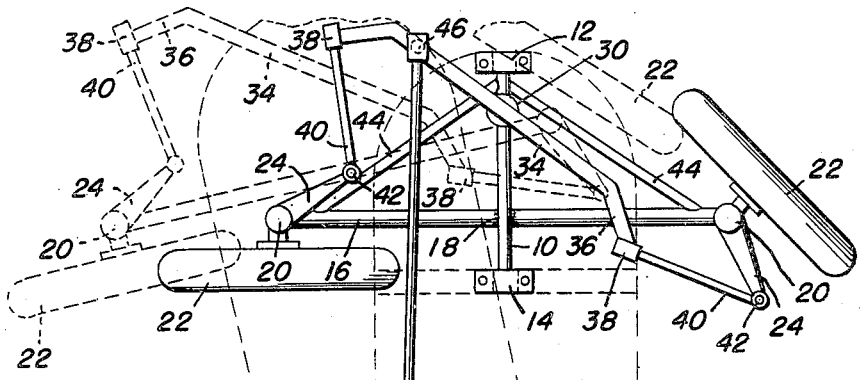
Figure 1:
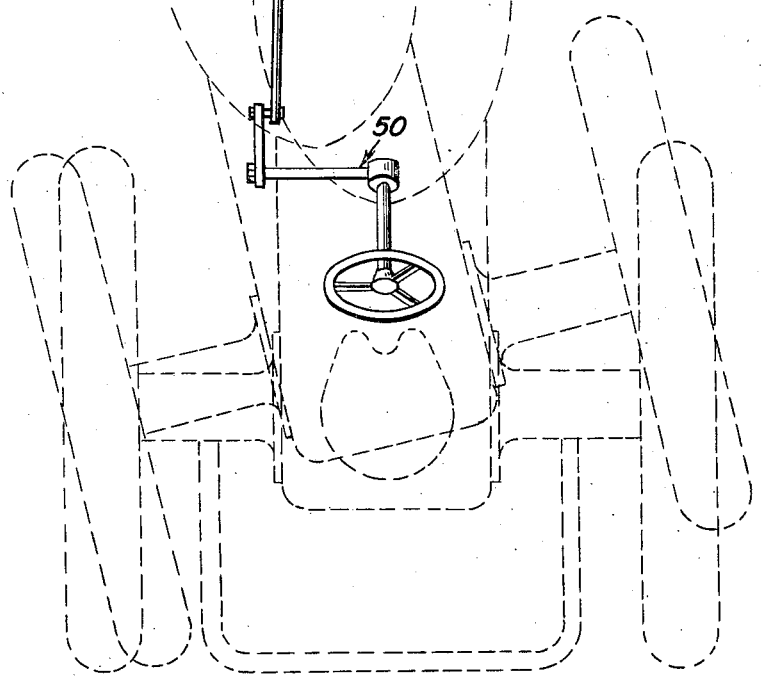

Nov. 22, 1949

C. H. SMALLWOOD 2,488,989

PIVOT TURNING ATTACHMENT FOR FARM TRACTORS

Filed Nov. 19, 1948

2 Sheets-Sheet 1

Inventor

Charles H. Smallwood

By Clarence A. O'Brien
and Harvey B. Jacobson
Attorneys

Inventor
Charles H. Smallwood

Patented Nov. 22, 1949

2,488,989

UNITED STATES PATENT OFFICE 2,488,989

PIVOT TURNING ATTACHMENT FOR FARM TRACTORS

Charles H. Smallwood, Brownington, Mo.

Application November 19, 1948, Serial No. 60,974

4 Claims. (Cl. 280—95)

This invention relates to a pivot turning attachment for a farm tractor and more particularly to a farm tractor of the type wherein the front wheels are set the same distance apart as the rear wheels of the tractor.

Farm tractors of the type to which the invention relates are well known to be incapable of making a pivot turn about a vertical axis which coincides with the point of contact of the rear wheels with the ground. As a consequence farm tractors having the front steering wheels set close together have found wide utility, but in certain farming operations, such tractors interfere with the crop rows, and hence cannot be used. As a consequence the advantages of a farm tractor capable of making a pivot turn and at the same time having the front wheels set to align with the rear or traction wheels would find wide utility.

The object of the invention is to enable a farm tractor of the type in which the front wheels are widely separated to make a pivot turn about a vertical axis which coincides with one or the other of the rear wheels of the tractor.

Another object is to convert conventional farm tractors of the type above mentioned so as to enable them to make pivot turns.

The above and other objects may be attained by employing this invention which embodies among its features an elongated horizontal king shaft mounted on the tractor beneath the front end thereof to rock about an axis which lies in a vertical plane with the longitudinal axis of the tractor, means permanently connecting the front axle of the tractor to the king shaft for rocking movement in a vertical plane, a tie bar pivotally mounted on the king shaft in advance of the axle to swing in a horizontal arc, a drag link coupling the tie bar to the steering mechanism of the tractor, and links connecting opposite ends of the tie bar to the steering knuckles carried at opposite ends of the axle.

Other features include means to adjust the length of the links for regulating the wheel alignment of the steering wheels.

Figure 2:
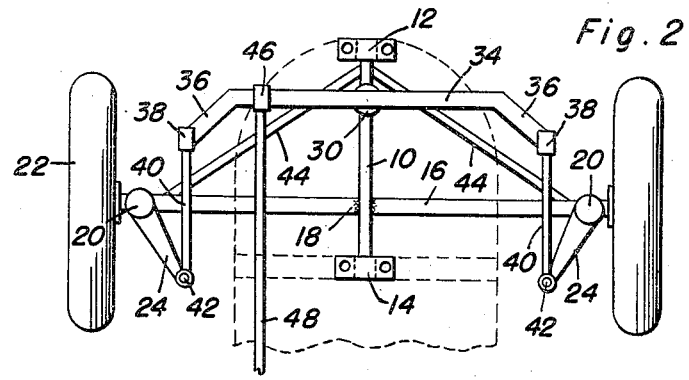
Figure 3:
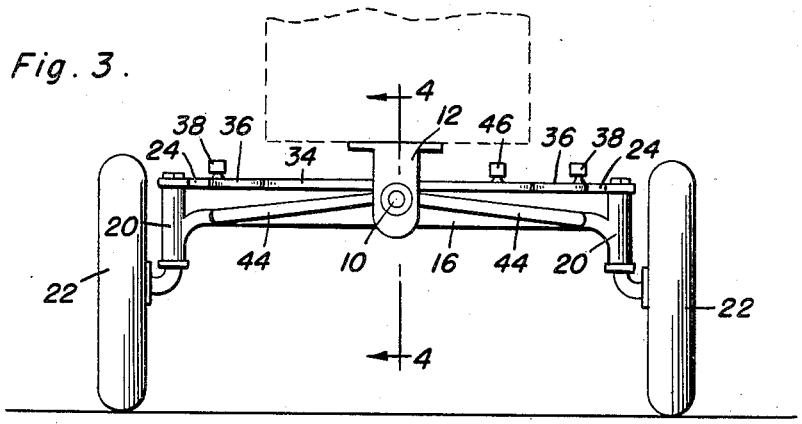
Figure 4:
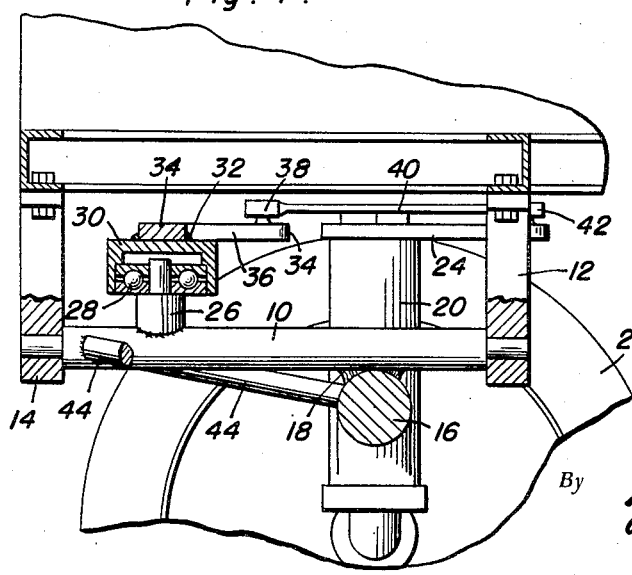

In the drawings:

Figure 1 is a top plan view of this improved tractor attachment showing the manner of use when it is mounted on a farm tractor, the tractor being shown in phantom, Figure 2 is a plan view of the steering mechanism with the wheels set for normal operation, Figure 3 is a front view of the device illustrated in Figure 2, and Figure 4 is an enlarged fragmentary sectional view taken substantially along the line 4—4 of Figure 3.

Referring to the drawings in detail, an elongated king shaft 10 is mounted in bearings 12 and 14, which are fixed to the underside of a farm tractor in any conventional manner, to rock about a horizontal axis which lies in a vertical plane with the longitudinal axis of the tractor. A conventional axle 16 is welded or otherwise permanently fixed as at 18 to the king shaft 10 near the rear end thereof, and carried at opposite ends of the axle 16 are conventional steering knuckles 20 upon which the front ground contacting wheels 22 of the tractor are mounted to rotate. Each steering knuckle is provided with an arm 24 which swings in a horizontal arc in a conventional manner. Fixed to the king shaft 10 and extending upwardly therefrom near its forward end is a pivot stud 26 carrying at its upper end a conventional anti-friction bearing 28 which is enclosed in a suitable housing 30.

Welded or otherwise fixed as at 32 midway between opposite ends to the housing 30 is a tie bar 34, opposite ends of which are turned rearwardly as at 36, and pivotally coupled as at 38 to each end of the tie bar 34 is one end of a link 40, the opposite end of which is pivotally coupled as at 42 to an arm 24, so that as the tie bar 34 is rotated about its pivot 26, the wheels 22 will be moved about the vertical axis of their respective steering knuckles 20. In the preferred form of the invention, the couplings 38 are adjustable longitudinally of their respective links 40, so that the wheels may be properly aligned with one another to track with the rear traction wheels of the tractor. Suitable radius rods 44 are connected to the axle 16 adjacent opposite ends thereof and extend forwardly in convergent relation, with their forward ends fixed in any suitable manner to the king shaft 10 in advance of the stud 26.

Pivotally coupled as at 46 to the tie bar 34 near one end thereof is one end of the drag link 48 of the conventional steering mechanism designated generally 50 of the tractor.

In use when the tractor is travelling along a straight path, the steering mechanism 50 is adjusted so as to hold the tie bar 34 transversely of the tractor as illustrated in Figure 2. Obviously conventional turns may be made by operating the steering mechanism 50 to swing the tie bar 34 about its pivotal connection with the king shaft 10. When a pivot turn is to be made, the steering mechanism 50 of the tractor is manipulated to swing the tie bar 34 to its fullest extent at which time one of the wheels 22 will be moved through an arc of ninety degrees as illustrated in Figure 1, while the opposite wheel 22 will be moved to an intermediate angle of approximately forty five degrees from its initial position. Obviously by turning the first mentioned wheel through the ninety degree arc resistance will be offered to the forward movement of the tractor so that the traction wheel immediately behind the wheel which has been set crosswise will be held stationary, while the traction wheel on the opposite side of the tractor will be rotated to cause the tractor to pivot around the stationary traction wheel as suggested by the dotted lines in Figure 1. The wheel set at the intermediate angle will serve to guide the front end of the tractor around the pivot point, and so long as the parts remain in the position shown in Figure 1 the vehicle will pivot around a vertical axis coincident with the traction wheel which is restrained against rotation. Obviously by manipulating the steering mechanism 50 to reverse the position of the wheels 22 from that shown in Figure 1, the tractor may be made to pivot in the opposite direction.

While in the foregoing there has been described the preferred embodiment of this invention it is to be understood that minor changes in the details of construction, combination and arrangement of parts may be resorted to without departing from the spirit and scope of the invention as claimed.

Having described the invention, what is claimed as new is:

1. In a farm tractor of the type having rear traction wheels, a transverse front axle mounted on the tractor to rock in a vertical arc, steering knuckles mounted on opposite ends of the front axle to swing in horizontal arcs, ground wheels mounted on the steering knuckles, a steering wheel and a drag link operated by the steering wheel, an attachment for enabling said tractor to make a pivot turn about a vertical axis coincident with one or the other traction wheels, said attachment comprising an elongated horizontal king shaft mounted on the tractor beneath the front end thereof to rock about an axis which lies in a vertical plane with the longitudinal axis of the tractor, means permanently coupling the front axle to the king shaft, a tie bar pivotally supported on the king shaft in advance of the axle to swing in an arc which lies parallel to the axle, means coupling the drag link to the tie bar and links connected to opposite ends of the tie bar and to the steering knuckles.

2. In a farm tractor of the type having rear traction wheels, a transverse front axle mounted on the tractor to rock in a vertical arc, steering knuckles mounted on opposite ends of the front axle to swing in horizontal arcs, ground wheels mounted on the steering knuckles, a steering wheel and a drag link operated by the steering wheel, an attachment for enabling said tractor to make a pivot turn about a vertical axis coincident with one or the other traction wheels, said attachment comprising an elongated horizontal king shaft mounted on the tractor beneath the front end thereof to rock about an axis which lies in a vertical plane with the longitudinal axis of the tractor, means permanently coupling the front axle to the king shaft, a tie bar pivotally supported on the king shaft in advance of the axle to swing in an arc which lies parallel to the axle, means coupling the drag link to the tie bar and links connected to opposite ends of the tie bar and to the steering knuckles, and means to vary the lengths of the links.

3. In a farm tractor of the type having rear traction wheels, a transverse front axle mounted on the tractor to rock in a vertical arc, steering knuckles mounted on opposite ends of the front axle to swing in horizontal arcs, ground wheels mounted on the steering knuckles, a steering wheel and a drag link operated by the steering wheel, an attachment for enabling said tractor to make a pivot turn about a vertical axis coincident with one or the other traction wheels, said attachment comprising an elongated horizontal king shaft mounted on the tractor beneath the front end thereof to rock about an axis which lies in a vertical plane with the longitudinal axis of the tractor, means permanently coupling the front axle to the king shaft, a tie bar pivotally supported on the king shaft in advance of the axle to swing in an arc which lies parallel to the axle, means coupling the drag link to the tie bar and links connected to opposite ends of the tie bar and to the steering knuckles, and an anti-friction bearing pivotally connecting the tie bar to the king shaft.

4. In a farm tractor of the type having rear traction wheels, a transverse front axle mounted on the tractor to rock in a vertical arc, steering knuckles mounted on opposite ends of the front axle to swing in horizontal arcs, ground wheels mounted on the steering knuckles, a steering wheel and a drag link operated by the steering wheel, an attachment for enabling said tractor to make a pivot turn about a vertical axis coincident with one or the other traction wheels, said attachment comprising an elongated horizontal king shaft mounted on the tractor beneath the front end thereof to rock about an axis which lies in a vertical plane with the longitudinal axis of the tractor, means permanently coupling the front axle to the king shaft, a tie bar pivotally supported on the king shaft in advance of the axle to swing in an arc which lies parallel to the axle, means coupling the drag link to the tie bar, links connected to opposite ends of the tie bar and to the steering knuckles, and radius rods fixed to the axle adjacent opposite ends thereof and to the king shaft in advance of the pivotal connection of the tie bar with the king shaft.

CHARLES H. SMALLWOOD.

REFERENCES CITED

The following references are of record in the file of this patent:

UNITED STATES PATENTS

| Number | Name | Date |
| --- | --- | --- |
| 1,635,706 | Carey | July 12, 1927 |
| 2,122,924 | Ammen et al. | July 5, 1938 |
| 2,191,961 | Howell | Feb. 27, 1940 |

FOREIGN PATENTS

| Number | Country | Date |
| --- | --- | --- |
| 841,047 | France | May 9, 1939 |